(12) United States Patent
Norris

(10) Patent No.: US 6,837,991 B1
(45) Date of Patent: Jan. 4, 2005

(54) ALGAE SCRUBBER FILTRATION SYSTEM

(76) Inventor: Joe Norris, 270 Castle Blvd., Akron, OH (US) 44313

( * ) Notice: Subject to any disclaimer, the term of this patent is extended or adjusted under 35 U.S.C. 154(b) by 54 days.

(21) Appl. No.: 10/146,633

(22) Filed: May 14, 2002

(51) Int. Cl.[7] .............................. C02F 3/08; C02F 3/32
(52) U.S. Cl. ...................... 210/150; 210/169; 210/602; 210/619
(58) Field of Search .............................. 210/150, 151, 210/167, 169, 195.1, 602, 619

(56) References Cited

U.S. PATENT DOCUMENTS

| | | | | |
|---|---|---|---|---|
| 1,811,181 A | * | 6/1931 | Maltby | 210/150 |
| 4,268,385 A | * | 5/1981 | Yoshikawa | 210/150 |
| 5,647,983 A | * | 7/1997 | Limcaco | 210/169 |
| 5,779,885 A | * | 7/1998 | Hickok et al. | 210/150 |
| 5,853,591 A | * | 12/1998 | Snyder et al. | 210/619 |
| 5,868,926 A | * | 2/1999 | Hickok et al. | 210/150 |

* cited by examiner

Primary Examiner—Christopher Upton

(57) ABSTRACT

An improved algae scrubber system having a partially submerged rotatable drum (16) wrapped in plastic mesh or algae screen (18). The rotatable drum (16) is supported by a water treatment tank (24). The water treatment tank (24) is in fluid communication with a second tank (32) by way of an influent pipe (28) and an effluent pipe (10). The unique shape and placement of the effluent pipe (10) forces virtually all of the water to pass directly through the algae screen (18). This configuration also allows for an increase in stimulating turbulence for the algae while creating very intimate contact between the algae and waste laden water (34). The water flowing directly through the algae screen (18) discourages over population of herbivorous invertebrates by dislodging them.

9 Claims, 6 Drawing Sheets

ALGAE SCRUBBER FILTRATION SYSTEM

FEDERALLY SPONSORED RESEARCH

Not Applicable

SEQUENCE LISTING OR PROGRAM

Not Applicable

BACKGROUND

1 Field of the Invention

This invention relates to filtration systems, specifically an improved algae scrubber.

2. Background

This invention relates to water filtration, specifically an improved algae scrubber. Natural filtration such as algae scrubbers promote thriving populations of plankton. These plankton populations are especially useful to properly maintain the filter feeding animals that are predominate in modern reef aquariums. Algae scrubbers also maintain a high oxygen level, remove carbon dioxide and nitrogenous waste. Thus, algae scrubbing controls pH and maintains water quality. For optimum performance, the area for algae must be maximized, and the algae must intimately contact waste laden water in a turbulent environment.

In his book *Dynamic Aquaria*, Mr. Walter Adey discusses an oscillating algae scrubber, a rocking algae scrubber, and a surge bucket algae scrubber. These devices allow a large percentage of water to flow around and over the algae screen. They also have moving parts that can be prone to failure.

Prior art, (U.S. Pat. No. 5,647,983 to Limcaco) shows effluent pipe cut at 90 degrees, several inches form the algae screen as shown on FIG. 1 which:

(a) allows a large percentage of waste laden water to flow over and around algae screen;

(b) creates less than maximum turbulence for stimulating algal growth;

(c) necessitates a wide gap in the algae screen to expose enough width of capture fins for drum rotation.

Thus, the area of the algae screen is diminished, adversely affecting the purification capability of the system. While plankton in general is beneficial to an aquarium, these systems can allow herbivorous invertebrates to over populate an algae screen. They eat the algae, contributing to the waste load. At the same time they reduce the efficiency of the algae scrubber.

OBJECTS AND ADVANTAGES

Accordingly, several objects and advantages of the present invention are:

(a) To force virtually all the water to pass directly through the algae screen rather than over or around the algae screen.

(b) To create the maximum amount of turbulence to stimulate algal growth. It also creates a very intimate environment between waste laden water and the algae screen.

(c) To increase algae screen area. The unique shape and placement of the effluent pipe allow a small gap in the algae screen. This corresponds to an increase in algae screen area with no increase to the footprint of the filtration system. In most cases, this filtration system will be located next to the display aquarium, where a compact filtration unit is advantageous.

(d) Over population of herbivorous invertebrates in the algae screen is discouraged. The intense water movement directly through the algae screen dislodges these invertebrates. Then they are preyed upon by other animals in the system.

These advantages provide an enhanced capability for algae filtration. These enhancements could, in the event of one aquatic animal's death, be the difference between toxins killing every animal in the aquarium, known as an aquarium crash, and swift recovery to acceptable water parameters.

Further objects and advantages of my invention will become apparent from a consideration of the drawings and ensuing description.

SUMMARY

The present invention relates to an improved algae scrubber.

(a) A partially submerged rotatable drum is wrapped in plastic mesh as an anchor for algal growth.

(b) The effluent pipe is shaped to match the perimeter of the rotatable drum.

(c) The effluent pipe is positioned about ⅛ inch from the rotatable drum.

This forces virtually all of the water to flow directly through the algae screen every time the water is circulated, enhancing the purification capacity.

DESCRIPTION

A preferred embodiment of an algae scrubber system of the present invention is illustrated in FIG. 2 and FIG. 3. The algae scrubber system has an effluent pipe 10 with a shaped end 12. The shaped end 12 is cut to match a perimeter 14 of a rotatable drum 16. The rotatable drum 16 is wrapped in an algae screen 18. The algae screen 18 is split radially, exposing a narrow gap 20 in the middle of the rotatable drum 16. The gap 20 in the algae screen 18 is as wide as the inside diameter of the effluent pipe 10. The shaped end 12 of the effluent pipe 10 is positioned approximately ⅛ inch from the rotatable drum 16, and centered at the gap 20 in the algae screen 18.

The rotatable drum 16 wrapped in the algae screen 18 is approximately 50% submerged by a water level 36. An air pump P delivers a waste laden water-air mixture 34 to a set of capture fins 22 by way of the effluent pipe 10. The waste laden water-air mixture 34 is injected between the capture fins 22 and travels laterally before exiting directly through the algae screen 18 as shown in FIG. 5.

Construction of the preferred embodiment of the rotatable drum 16 is as follows. Different materials, fastening methods and dimensions could easily be used. This is in no way meant to limit the scope of the invention.

(a) A 12 inch diameter PVC pipe 27 cut to a certain length;

(b) Capture fins 22 (¼ inch thick PVC) approximately 2 inches wide, and cut to the same certain length as the PVC pipe 27 and glued lengthwise to the PVC pipe 27;

(c) Two pieces of PVC, ¼ inch thick, cut into circles having a perimeter 14 equal to the outermost edges of the capture fins 22 that are glued to the 12 inch diameter PVC pipe 27 (approximately 16 inch diameter) and glued to each end of the 12 inch diameter PVC pipe 27.

(d) The plastic mesh algae screen 18 is wrapped around the capture fins 22, leaving about a 2 inch gap 20 in the center to accept the waste laden water-air mixture 34 from the effluent pipe 10.

(e) An axis 26 is fastened to the center of the circular ends of the rotatable drum 16.

This section was included to help clarify the path taken by the waste laden water-air mixture 34. FIG. 5 shows the waste laden water-air mixture 34 moving directly through the algae screen 18.

Of particular importance with respect to the present invention is the unexpected discovery that injecting a waste laden water-air mixture 34 between the capture fins 22 forces the waste laden water-air mixture 34 to move laterally and then flow directly through the algae screen 18 as shown in FIG. 5. This ensures that:

(a) Virtually all the water is treated every time it circulates through the filtration system;

(b) Waste laden water 34 is in very intimate contact with the algae on the algae screen 18;

(c) The stimulating effect of turbulence on the algae is maximized, and (d) Overpopulation by herbivorous invertebrates in the algae screen 18 is discouraged by intense water movement.

These enhancements impart a much greater capacity for the algae to remove toxins from the water.

Purified water 35 then returns to a second tank 32 by way of an influent pipe 28, as shown in FIG. 6. Simultaneously, the water-air mixture 34 injected by the effluent pipe 10 causes the rotatable drum 16 wrapped in the algae screen 18 to rotate and water circulation is accomplished as depicted in FIG. 6.

The sides of a water treatment tank 24 support the axis 26 to allow rotation of the rotatable drum 16 as shown in FIG. 2. The axis 26 could consist of two stubs fastened to the outside of the rotatable drum 16 as shown in FIG. 2, or the axis 26 could extend through the center of the rotatable drum 16.

A light L source for the algae could be natural light, or more typically, any number of artificial light sources. Other embodiments contemplated but not limited to are:

(a) Multiple effluent pipes 10 as shown in FIG. 4;

(b) Square or rectangular tubing effluent pipes 10;

(c) Openings provided in circular ends of the rotatable drum 16;

(d) The rotatable drum 16 could be supported by a stand or a hanging device;

(e) A water level 36*a* could completely submerge the rotatable drum 16 (FIG. 2);

(f) A water level 36*b* could be below the rotatable drum 16 (FIG. 2);

(g) The filtration system could be driven by a water pump PW (FIG. 4);

(h) The rotatable drum could have a fan blowing on it.

REFERENCE NUMERALS IN DRAWINGS

Effluent pipe 10
Shaped end 12
Perimeter 14
Rotatable drum 16
Algae screen 18
Gap 20
Capture fins 22
Water treatment tank 24
Axis 26
PVC pipe 27
Influent pipe 28
Light L
Second tank 32
Water-air mixture 34
Purified water 35
Air pump P
Water level 36
Water level 36*a*
Water level 36*b*
Water pump PW

CONCLUSION

Figure 1:
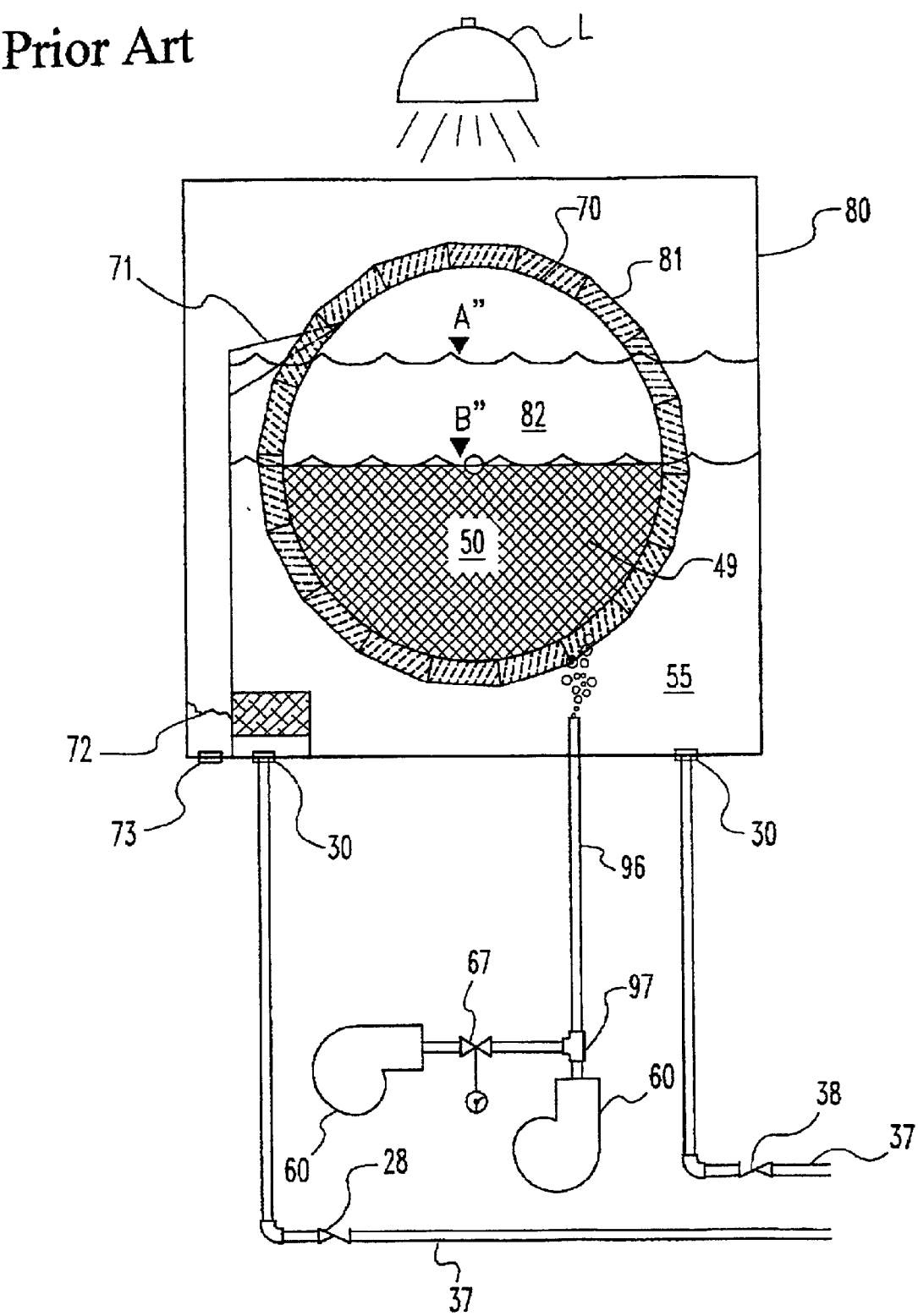
FIG. 1 is prior art (U.S. Pat. No. 5,755,961 to Limcaco).
Figure 2:
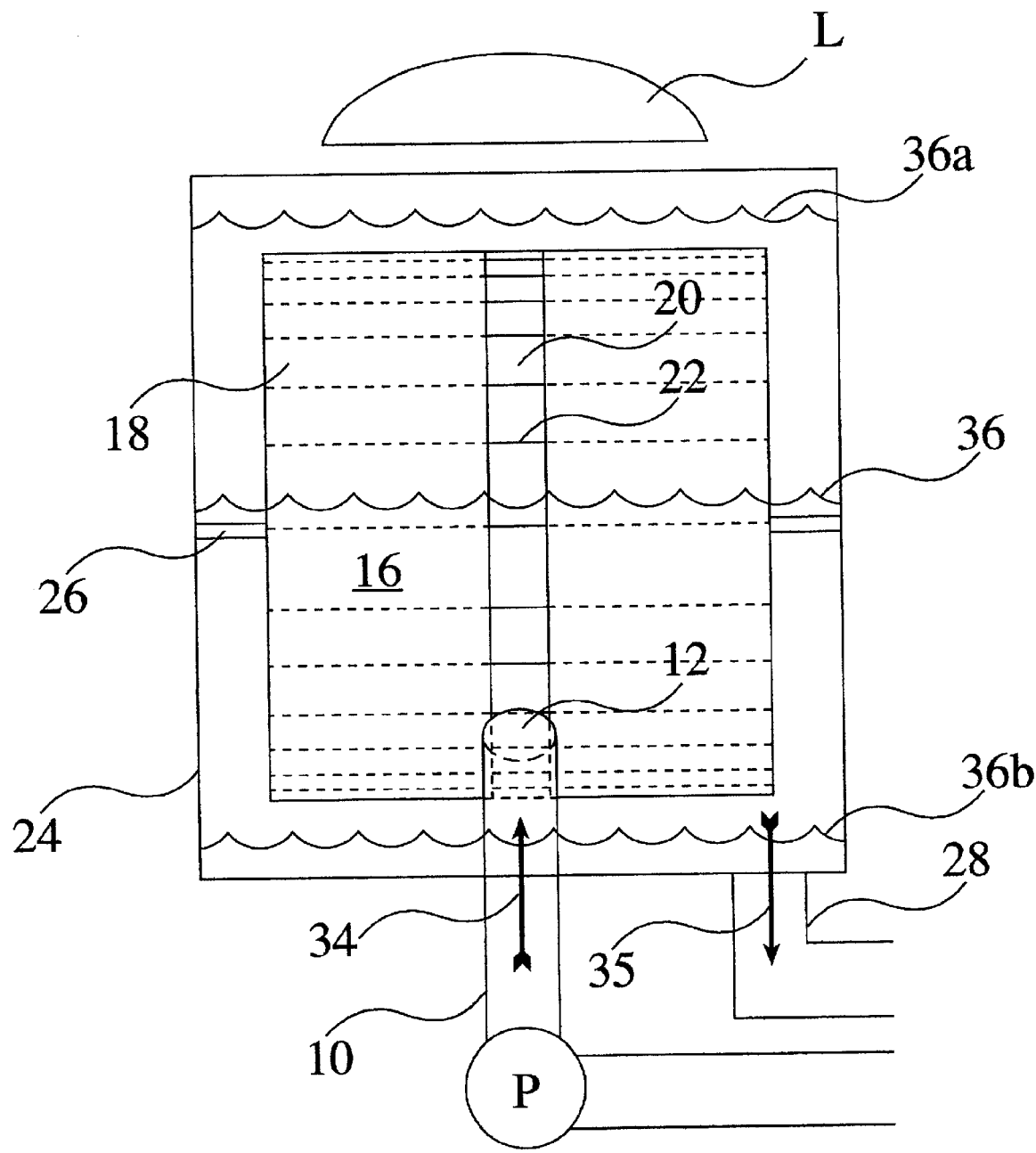
FIG. 2 is a front view of the algae scrubber system of the present invention.
Figure 3:
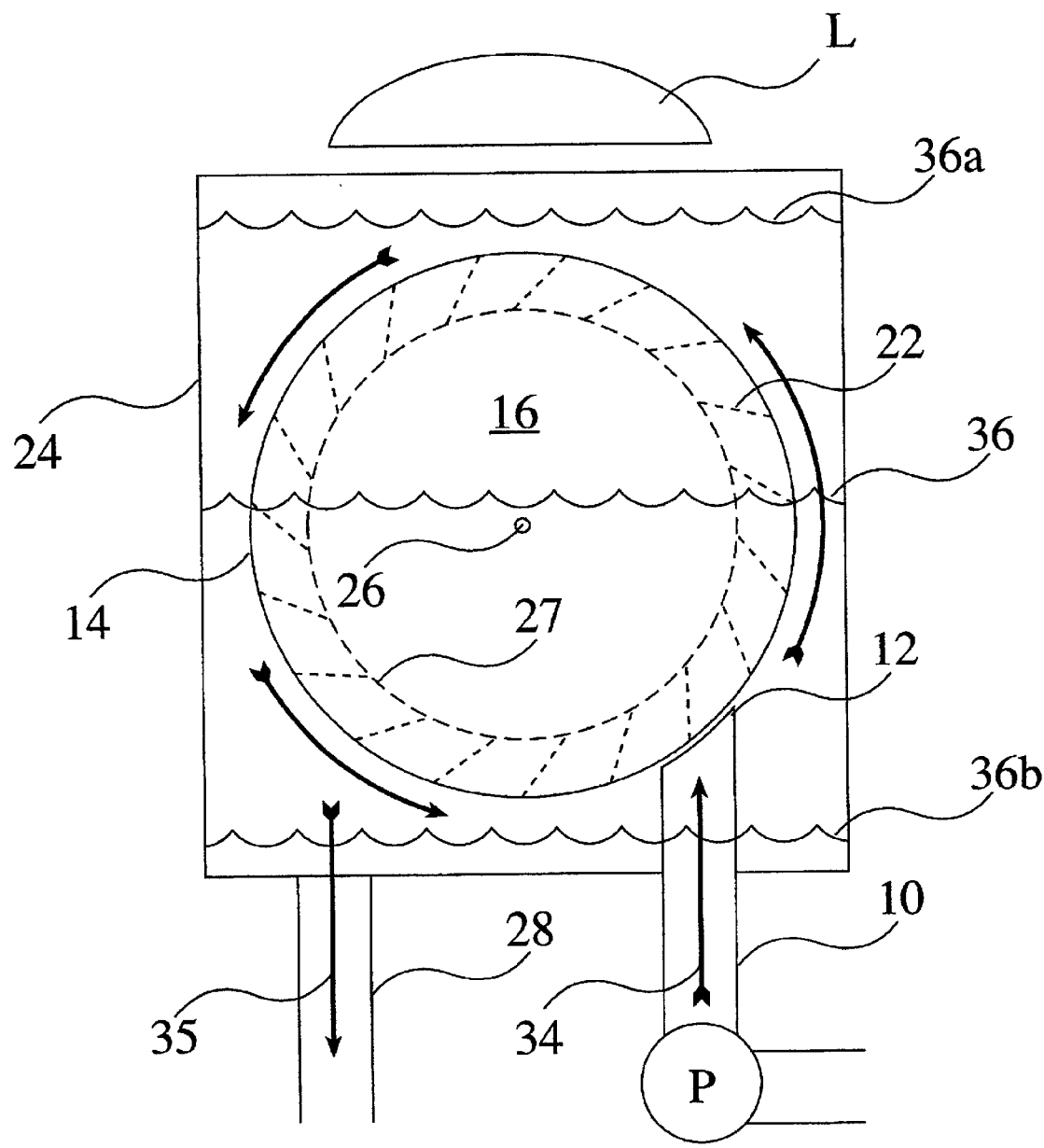
FIG. 3 is a side view of the algae scrubber system of the present invention.
Figure 4:
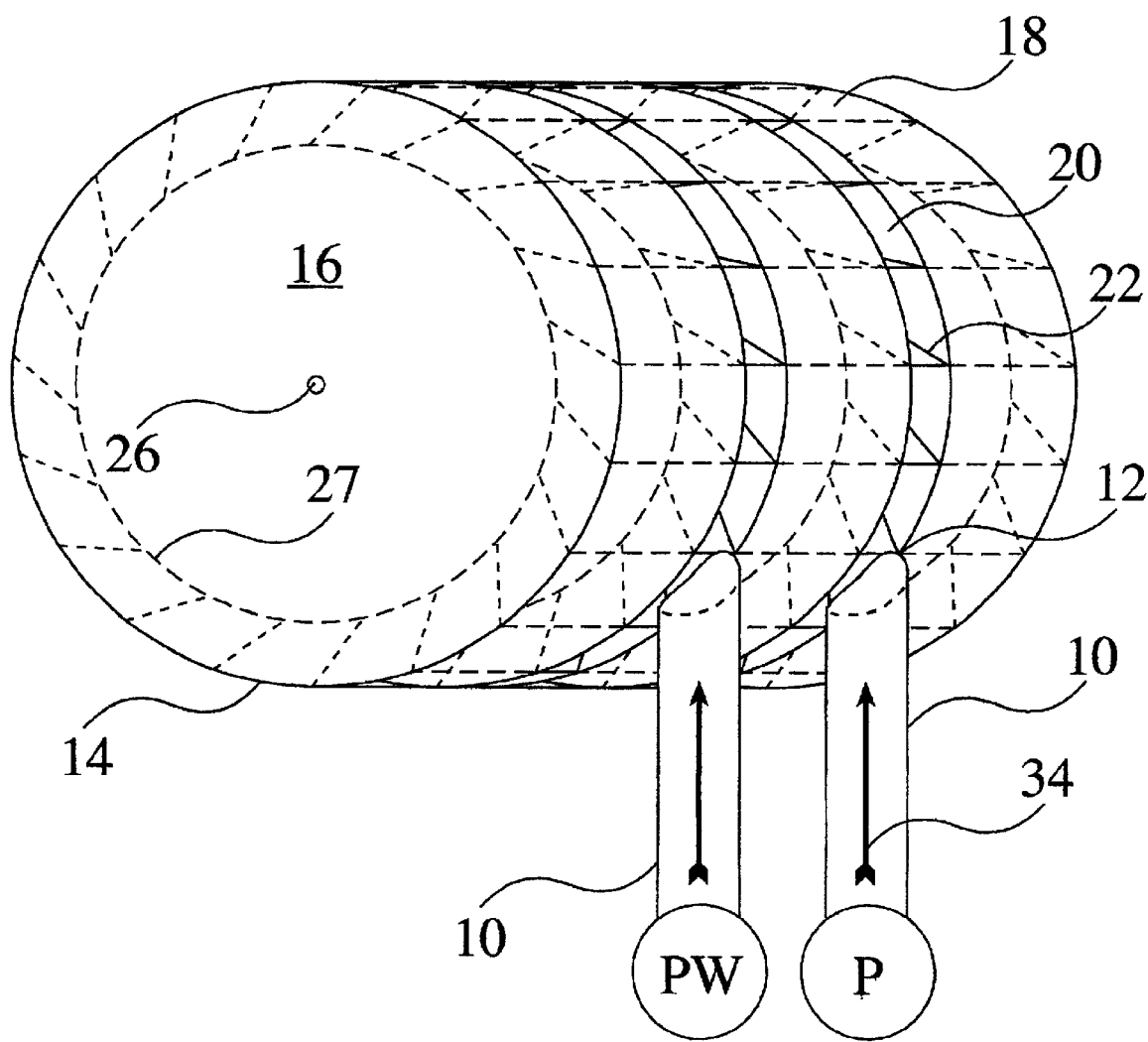
FIG. 4 is an embodiment of the present invention showing multiple effluent pipes in perspective.
Figure 5:
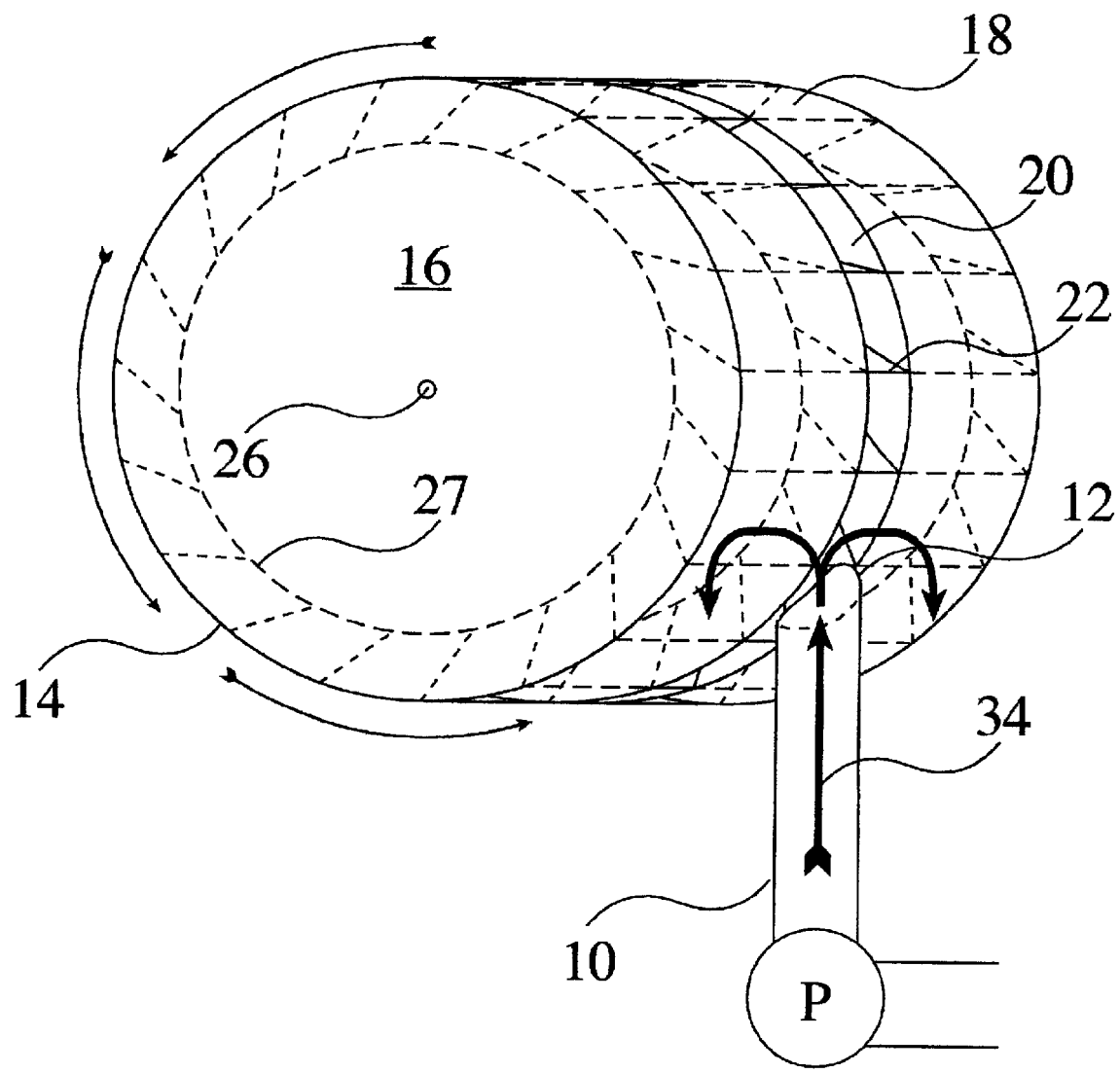
FIG. 5 details the flow of water in perspective.
Figure 6:
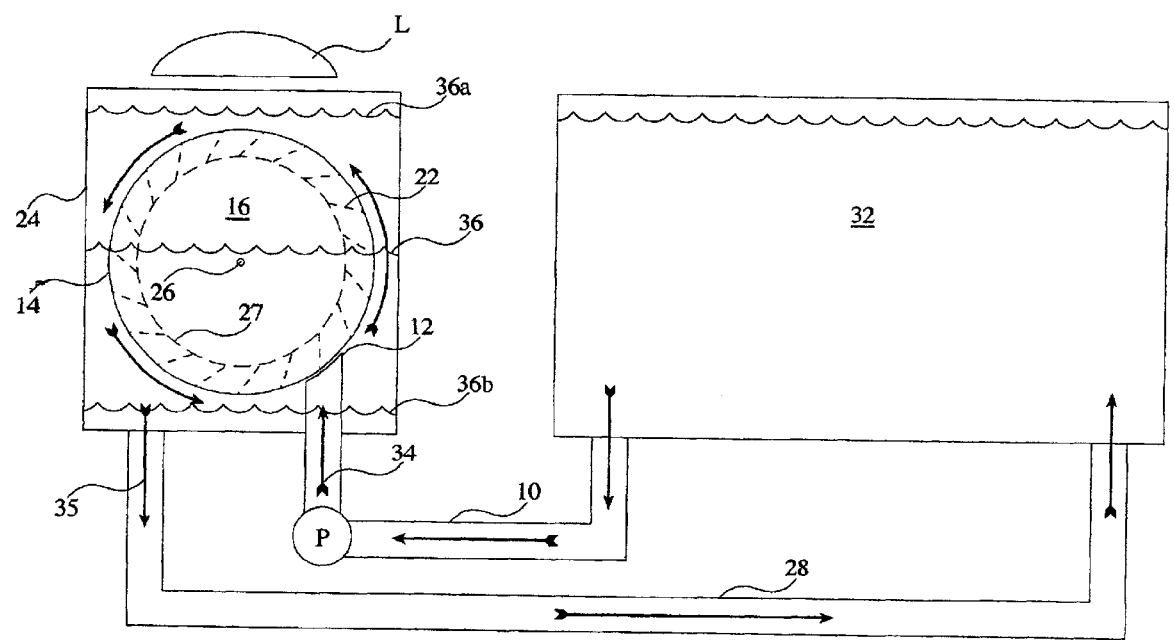
FIG. 6 is a front view showing water circulation.

The reader will see that the filtration system of the invention provides a superior environment for algae to thrive. This greatly enhances the ability of algae to purify water. While the above description contains one main embodiment, the invention is intended to cover all variations of this invention.

Some modifications have been suggested and others may come to mind, such as:

(a) using a water pump and an air pump simultaneously;

(b) placing the effluent pipe in a different position;

(c) suspending the rotatable drum above water; and (d) using a water pump.

The scope of the invention should be determined not by the embodiments shown, but by the appended claims and their legal equivalents.

What is claimed is:

1. An algal scrubber system comprising:

a) a drum having an axis and a perimeter, rotatably supported in a water treatment tank;

b) an effluent pipe having a substantially constant diameter and an end shaped to substantially match said perimeter of said drum, said effluent pipe in fluid communication with said water treatment tank and a second tank; said effluent pipe carrying effluent from said second tank to said water treatment tank;

c) an influent pipe in communication with said water treatment tank and said second tank, said influent pipe carrying influent to said second tank;

d) an algal screen fastened to said perimeter of said drum to support algal growth, said algal screen being split radially exposing a gap in said algal screen, said gap being about as wide as the inside diameter of said effluent pipe, said shaped end of said effluent pipe being located in close proximity to and below said gap in said algal screen, whereby substantially increasing the area of the algal screen;

e) means for rotating said drum comprising means within said gap for capturing effluent from said effluent pipe;

(f) for providing light.

2. The apparatus of claim 1 wherein said means for rotating said drum includes:
   (a) plurality of capture fins operatively associated with said drum;
   (b) said capture fins arranged to capture an air water mixture from an air pump, urging said air water mixture through said effluent pipe;
   (c) said air water mixture travels laterally between said capture fins then passing directly through said algae screen to rotate said drum and circulate water;
   whereby greater purification capacity per square inch of said algae screen is achieved.

3. The apparatus of claim 2 wherein a water pump is used to urge water through said effluent pipe for said drum rotation and said water circulation and purification.

4. The apparatus of claim 1 comprising; a plurality of said effluent pipes.

5. The apparatus of claim 1 wherein said drum is partially submerged in water.

6. The apparatus of claim 1 wherein said drum is completely submerged in water.

7. The apparatus of claim 1 wherein said drum is suspended above water.

8. The apparatus of claim 1 wherein said means for providing light includes natural light.

9. The apparatus of claim 1 wherein said means for providing light includes artificial light.

* * * * *